United States Patent [19]
van Kampen

[11] Patent Number: 5,812,047
[45] Date of Patent: Sep. 22, 1998

[54] OFFSET-FREE RESISTOR GEOMETRY FOR USE IN PIEZO-RESISTIVE PRESSURE SENSOR

[75] Inventor: Robertus P. van Kampen, Fremont, Calif.

[73] Assignee: Exar Corporation, Fremont, Calif.

[21] Appl. No.: 800,437

[22] Filed: Feb. 18, 1997

[51] Int. Cl.$^6$ .................................................... G01L 1/22
[52] U.S. Cl. ................................. 338/4; 338/2; 338/36; 338/42; 257/419
[58] Field of Search .............. 338/2, 4, 36, 42; 73/721, 727; 257/419

[56] References Cited

U.S. PATENT DOCUMENTS

| | | | |
|---|---|---|---|
| 3,772,628 | 11/1973 | Underwood et al. | 338/4 |
| 4,065,971 | 1/1978 | Shimazoe et al. | 73/727 |
| 4,173,900 | 11/1979 | Tanabe et al. | 73/727 |
| 4,315,236 | 2/1982 | Tominaga et al. | 338/4 |
| 4,516,148 | 5/1985 | Barth | 257/419 |
| 4,618,844 | 10/1986 | Takahashi et al. | 338/2 |
| 4,672,411 | 6/1987 | Shimizu et al. | 257/419 |
| 4,726,232 | 2/1988 | Koneval | 73/708 |
| 4,904,978 | 2/1990 | Barth et al. | 338/47 |
| 5,412,993 | 5/1995 | Ohtani | 73/727 |

FOREIGN PATENT DOCUMENTS 1682842  10/1991  U.S.S.R. ................ 338/36

*Primary Examiner*—Teresa J. Walberg
*Assistant Examiner*—Karl Easthom
*Attorney, Agent, or Firm*—Townsend and Townsend and Crew LLP

[57] ABSTRACT

An improved resistor and connection region structure in which the geometries of the connection regions for a pair of radial resistors correspond to the connection region geometries for a pair of tangential resistors, thus inherently eliminating the need for varying connection regions to compensate for offset. In particular, the radial resistors are formed by placing two legs in parallel with each other and connecting those legs in series on opposite sides of the membrane, with the connection region on the interior of the membrane. The tangential resistors, on the other hand, are formed on the opposite sides by placing two legs in series with each other and connecting those legs in series, with an interior connection region connecting them.

6 Claims, 4 Drawing Sheets

OFFSET-FREE RESISTOR GEOMETRY FOR USE IN PIEZO-RESISTIVE PRESSURE SENSOR

BACKGROUND OF THE INVENTION

The present invention relates to piezo-resistive pressure sensors, and in particular to geometries for minimizing offset voltages.

In piezo-resistive pressure sensors, the sensor output is obtained by a change in resistor values due to an applied pressure. Typically, there are two sets of resistors, one set who's value increase with pressure applied from the top of the device (and who's value decrease with pressure applied from the bottom of the device), and one set who's value decreases with pressure applied from the top of the device (and who's value increase with pressure applied from the bottom of the device). These resistors are connected in a wheatstone bridge, in such a way that a positive signal arises when pressure is applied from one side and a negative signal arises when pressure is applied from the other side.

When using p-type resistors oriented in the <110> direction (a type and direction very often used in piezo-resistors, due to the high sensitivity), the desired effect can be obtained by orienting the resistors in such a way that the current flows either in a direction in parallel with the edge of the membrane or in a direction orthogonal to the edge of the membrane, as shown in FIG. 1. The piezo-resistors each typically consists of a low-doped p-region, since the piezoresistance effect is the highest for this type of material. In order to connect the piezo-resistors in a wheatstone bridge or to the bond pads, usually high-doped p material is connected to the low doped resistor. This high-doped material runs off the membrane area onto the rim and is connected to a metal interconnect layer outside the membrane. The high-doped material region adds resistance to the piezo-resistor. To avoid an offset voltage, the contribution of the high-doped regions to both resistors has to be the same. This can be achieved by using a special configuration such as shown in FIG. 2 (actual layout plot of SM39 pressure die of SMI).

Some applications require the bridge resistance to be higher. This can be achieved by increasing the length of the resistors. However, by increasing the length of the resistor orthogonal to the edge of the membrane, this resistor extends further into the membrane or rim, thereby losing sensitivity. To overcome this problem, the resistor is usually split up into two legs, as shown in FIG. 3. To avoid an offset voltage due to resistor mismatch, the contribution of the high-doped regions has to be the same again. However, since the geometries of the resulting resistors will not be the same, iterative finite-element modeling on several resistor structures needs to be performed to ensure resistor matching, in order to minimize the offset. The resulting resistor geometry is shown FIG. 4 (actual layout plot of SM21 pressure die of SMI).

Performing the finite element modeling to match the resistors can be a time-consuming procedure. Moreover, changes/variations in processing parameters, such as changes/variations in doping levels of the low-doped and high doped regions that define the piezo-resistors and changes/variations in the out-diffusion of several resistor layers (e.g. due to a longer required drive-in time to obtain a certain temperature coefficient), can cause a mismatch between the two sets of resistors, resulting in a change in the offset voltage.

SUMMARY OF THE INVENTION

The present invention provides an improved resistor and connection region structure in which the geometries of the connection regions for a pair of radial resistors correspond to the connection region geometries for a pair of tangential resistors, thus inherently eliminating the need for varying connection regions to compensate for offset. In particular, the radial resistors are formed by placing two legs in parallel with other and connecting those legs in series on opposite sides of the membrane, with the connection region on the interior of the membrane. The tangential resistors, on the other hand, are formed on the opposite sides by placing two legs in series with each other and connecting these legs in series with an interior connection region connecting them.

Additionally, in a preferred embodiment of the invention, the total length and width of the connection regions for the radial resistors equal the total length and width of the connection regions for the tangential resistors. Furthermore, the distance from the edge of the resistors to the closest edge of the connection regions is equalized for corresponding connection regions to equalize the effect of current flowing from the resistor region into the connection region, whether it is a straight transition or making a 90° turn. In the tangential resistors, this 90° turn occurs on the connection to the membrane, while on the radial resistors, this 90° turn occurs on the connection to the interior connection region.

For a further understanding of the nature and advantages of the invention, reference should be made to the following description taken in conjunction with the accompanying drawings.

DESCRIPTION OF THE PREFERRED EMBODIMENT

Before describing the present invention, the prior art will be described in more detail to enable a better understanding of the invention. Referring back to FIG. 1, a membrane indicated by border 12 is formed on a substrate. Typically, the membrane will be formed by etching away the back surface of the substrate to make the membrane area thinner than the rest of the substrate, and thus susceptible to pressure changes. A pair of tangential resistor areas 14 are shown, along with a pair of radial resistor areas 16. In order to use these in a wheatstone bridge, it is important that two of the resistors be radial, and two tangential, and that the resistances be equal.

Figure 1:
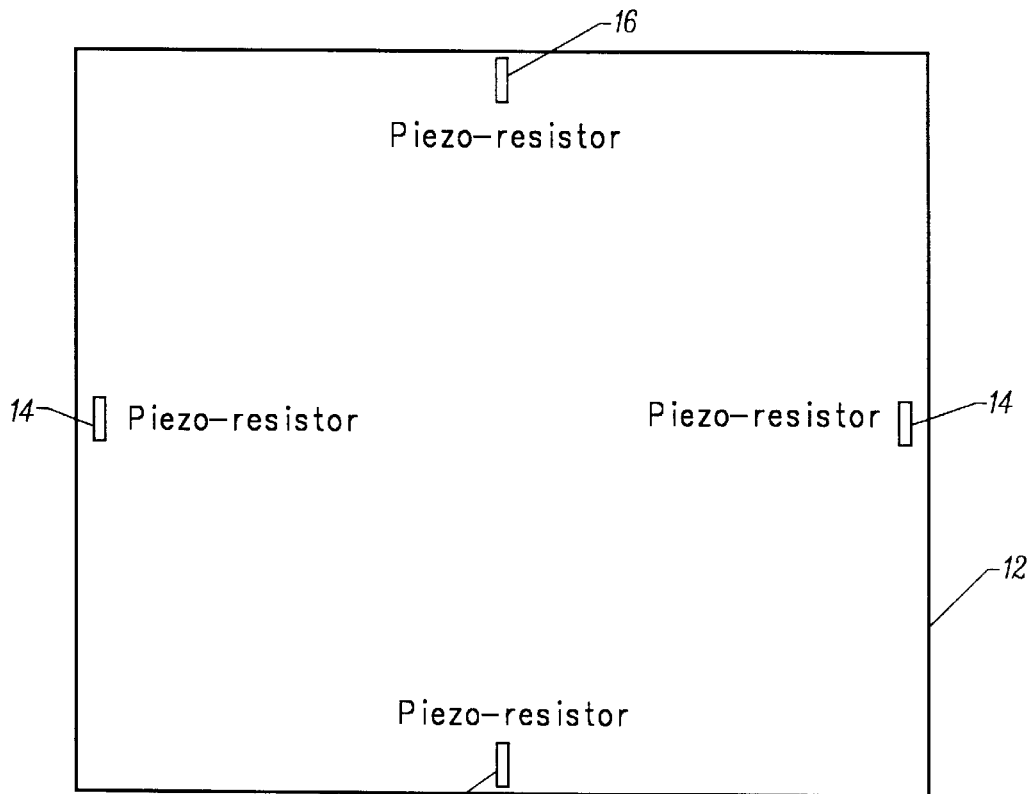
FIG. 1 is a diagram of a prior art single resistor orientation on a membrane.
Figure 2:
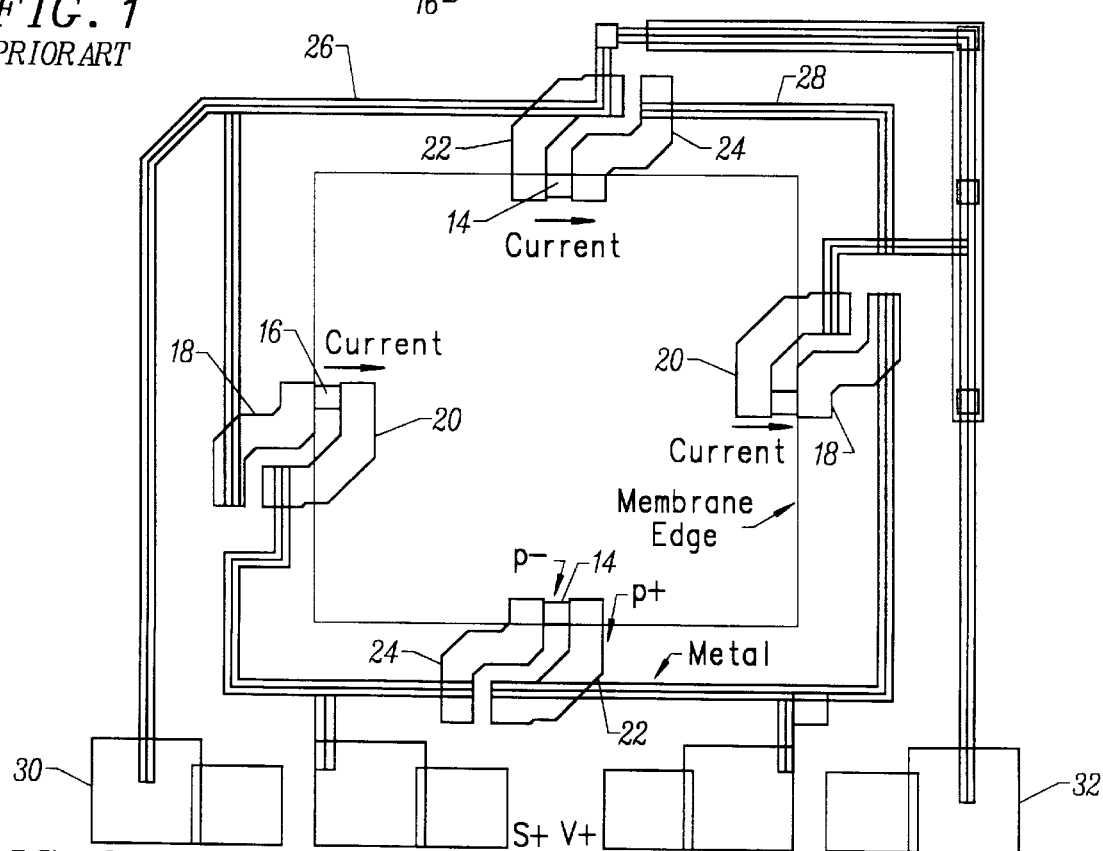
FIG. 2 is a diagram showing the connection regions and connecting lines for the single resistor arrangement of FIG. 1 according to the prior art.

FIG. 2 illustrates the connection to resistors as in FIG. 1, with the orientation rotated 90°. Each of resistors 16 is connected to by connection regions 18 and 20. Typically, these may be formed by a higher doped region which has higher conductivity, such as by using p+ doping connection regions 18 and 20, while p− doping is used in resistor region 16. Similarly, resistors 14 have connection regions 22 and 24. These are connected to connecting lines 26 and 28, respectively, which are connected to bonding pads 30 and 32.

As can be seen, the total area of connection regions 18 and 20 are equalized to the area of connection regions 22 and 24. If these areas were not equalized, they would add to the resistance and provide an undesired offset.

In some applications, it is desirable to have an increased resistance. Since the narrowness of the resistor contributes to the resistance, in order to increase resistance the resistor is typical lengthened. However, it is undesirable to have the radial resistor extend too far into the membrane, otherwise the pressure effects will not be similar to the tangential resistors which are closer to the edge. In addition, it is more desirable to measure the stress at the edge of the membrane than towards the center to achieve the desired sensitivity.

Figure 3:
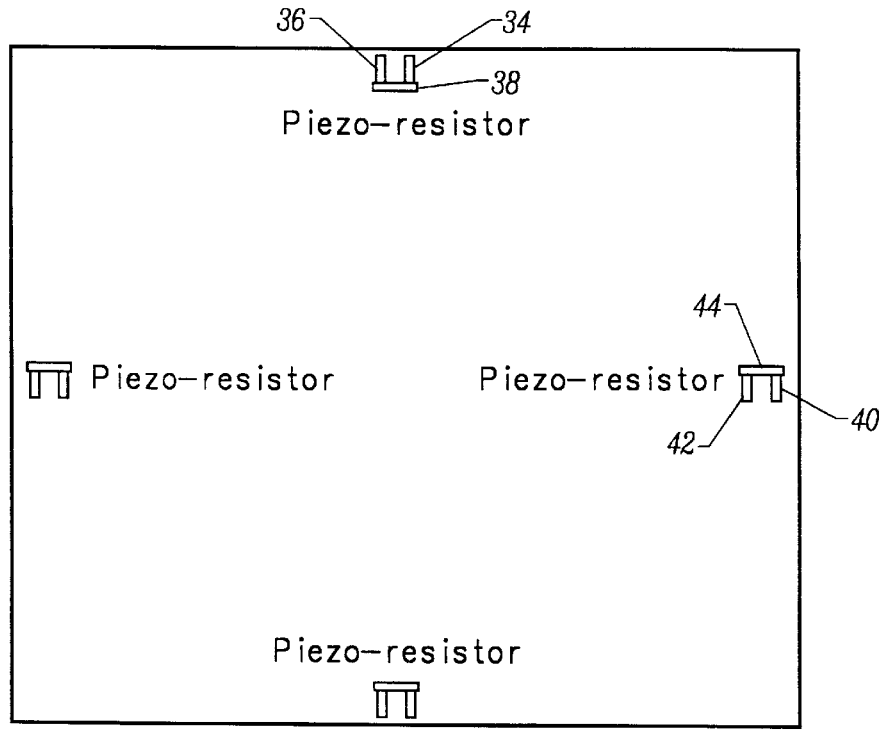
FIG. 3 is a diagram of the prior art resistor layout where the resistors are broken into two to maximize the resistance while keeping them close to the edge of the membrane.

Accordingly, an arrangement such as shown in FIG. 3 is sometimes used, where the resistor is split up into two legs placed in parallel, and connected in series. As shown in FIG. 3, a pair of radial resistor regions 34, 36 are joined by a connection region 38. Similarly, a pair of tangential resistors 40, 42 are joined by a connection region 44.

Figure 4:
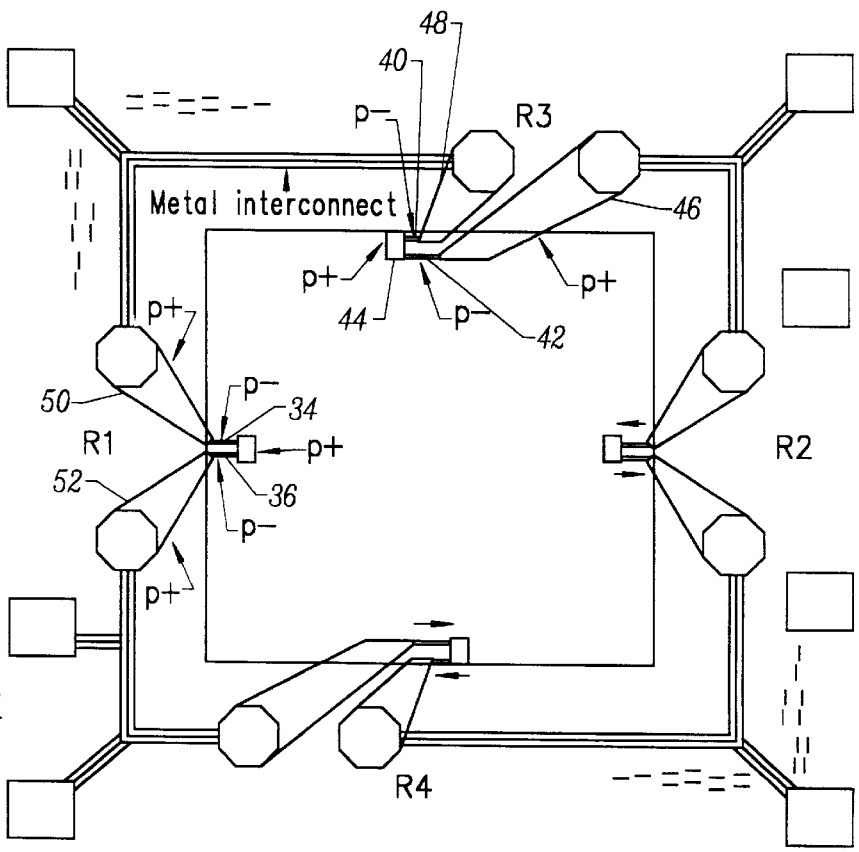
FIG. 4 is a diagram of a prior art connection region and connecting line arrangement for the resistors of FIG. 3.

FIG. 4 illustrates a prior method of connecting to the pairs of resistors. Again, the orientation of FIG. 4 is rotated 90 degrees with respect to that of FIG. 3. The total length of resistor 40 and 42 is the same as the total length of resistor 34 and 36. The length of resistor 40 is shorter than the length of resistor 42 to allow connection region 48 to connect to resistor 40. The idea for equalizing the radial and tangential resistors in this case is to change the geometry of regions 46 and 48 (or 50 and 52) by means of finite element modeling. In this way, the contribution of regions 46 and 48 to the resistance is the same as the contribution of regions 50 and 52 to the resistance, although the shape of these regions is completely different. Finite element modeling is required to equalize the resistance of these geometrically unequal regions.

Figure 5:
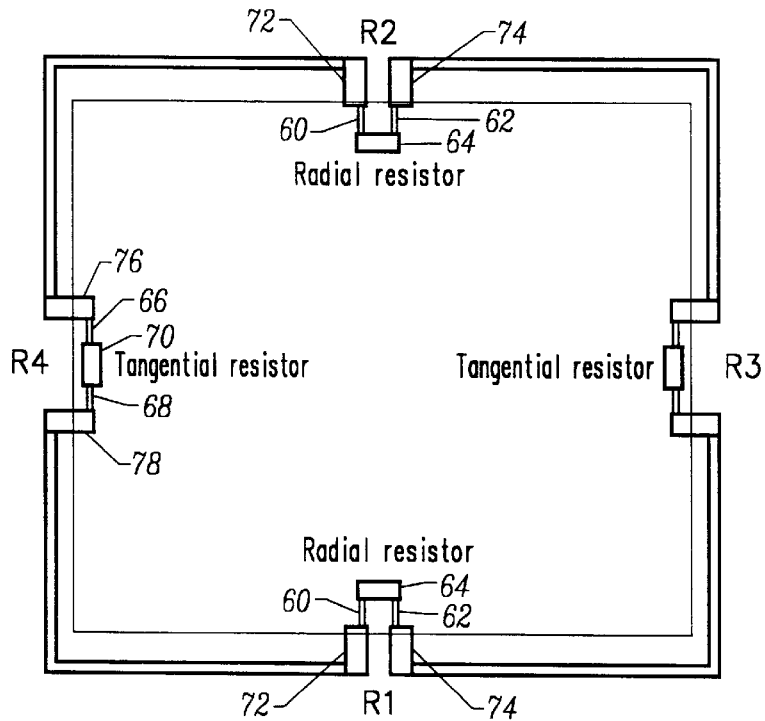
FIG. 5 is a diagram of the resistors, connection region and connecting lines according to the present invention.

The invention comprises of two resistor geometries; one in which the current flows in a direction in parallel with the radial stress in the membrane (radial resistor), and one in which the current flows in a direction orthogonal to the radial stress in the membrane, and thus tangential to the edge of the membrane (tangential resistor), as shown in FIG. 5. Due to the piezo-resistive effect, one resistor will increase while the other resistor will decrease and vice versa. The invented geometries inherently ensure resistor tracking in the absence of stress (i.e. the offset), independent of changes/variations in doping levels and out-diffusion (as long as the variations in both resistors are the same). As a result, the offset is minimized by default and finite-element modeling for resistor matching is no longer required.

Both resistors consist of two layers, a low-doped (high-resistive) layer, which mainly determines the resistor value, and a high doped (low-resistive) connection layer, which is primarily used to connect the resistor to the metal interconnect layer, located outside the membrane.

Referring to FIG. 5, the invention provides a pair of radial resistors 60, 62 which are placed in parallel, and connected in series at their interior ends by a connection region 64. A pair of tangential resistors 66 and 68 are placed in series with each other, and connected in series by an interior connection region 70. The other ends of resistors 60 and 62 are connected to by connection regions 72 and 74 respectively.

The other ends of resistors 66 and 68 are connected to by connection regions 76 and 78, respectively.

Figure 6A:
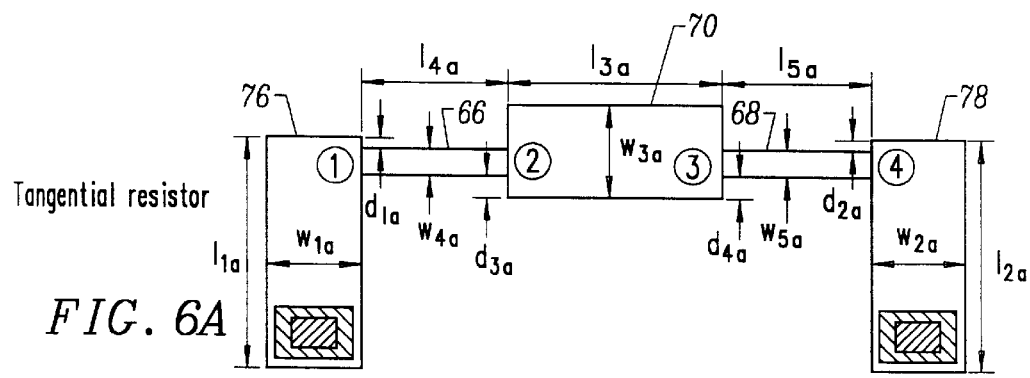
FIG. 6A and 6B provide more detail of the resistors and connection regions for the tangential resistor (FIG. 6A) and radial resistor (FIG. 6B) of FIG. 5.
Figure 6B:
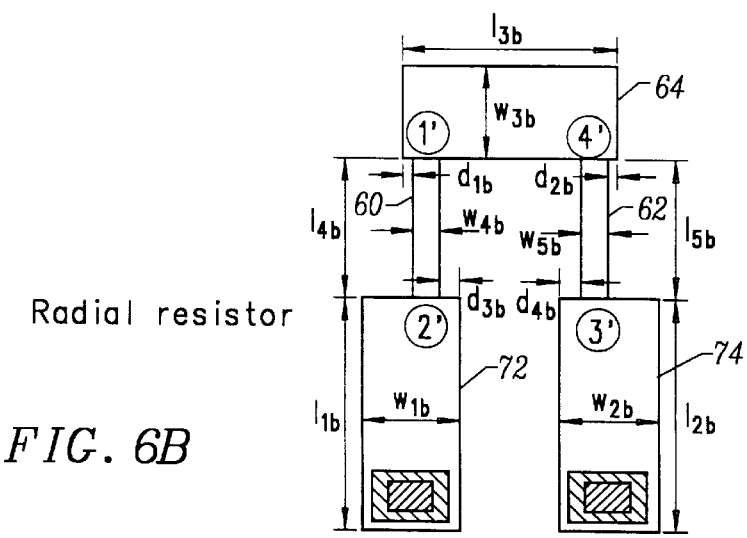

The geometries of the tangential and radial resistors are shown in more detail in FIG. 6A and 6B, respectively. As can be seen, in both geometries, the resistors have the same length and width, while the interior and exterior connection regions also have the same width and length.

Another important factor in determining the ;resistance is the effect of the current on going from the high-doped region into the low-doped region and vice versa. There are two kinds of transitions, one where the current goes straight from a high-doped region into a low-doped region and vice versa and one where the current goes around a right angle from a high-doped region into a low-doped region. In FIG. 6A, the current goes around the right angle in going from connection regions 76 to resistor 66. In FIG. 6B, on the other hand, a right angle is traversed from resistor 60 to interior connection region 64. The resistance is most significantly impacted by the shortest distance that the connection region overlaps the resistor at its right angle, which is shown as $d_{1a}$ in FIG. 6A, and $d_{1b}$ in FIG. 6B. Preferably, by equalizing these distances, the effect on the resistance will be the same. Note that this right angle occurs on the connection region connecting to the substrate in FIG. 6A, while it occurs on the connection region interior to the membrane in FIG. 6B. On the other hand, in FIG. 6A, the connection to the interior connection region 70 on the interior of the membrane is in a straight line, while similarly the connection to the connection regions extending off the membrane onto the substrate in FIG. 6B are in a straight line. The resistance is also most significantly impacted by the shortest distance that the connection region overlaps the resistor region at these straight transitions, which is shown as d3a in FIG. 7A and d3b in FIG. 6B. Preferably, by equalizing these distances, the effect on the resistance will be the same.

In order for both resistors to have the same absolute value, so that the final offset of the wheatstone bridge is 0 volts, the following rules are preferably met (see FIG. 6):

The width of all high-doped regions of the resistor have to be the same: $W_{1a}=W_{1b}=W_{2a}=W_{2b}=W_{3a}=W_{3b}$ The total length of all high-doped regions of the resistor have to be the same: $1_{1a}+1_{2a}+1_{3a}=1_{1b}+1_{2b}+1_{3b}$ The location and dimensions of the contact openings in the high-doped material have to be the same.

The width of all low-doped regions have to be the same: $W_{4a}=W_{4b}=W_{5a=W5b}$ The total length of all low-doped regions have to be the same: $1_{4a}+1_{5a}=1_{4b}+1_{5b}$ The overlap distances at corresponding transition regions from high-doped to low-doped material have to be the same: $d_{1a}=d_{1b}, d_{2a}=d_{2b}, d_{3a}=d_{3b}, d_{4a}=d_{4b}$ In this way, transition regions 1 and 1' have the same contribution to the total resistance. The same is true for transition regions 2 and 2', 3 and 3', 4 and 4'. Since all regions of the resistors have the same dimensions, both resistors have the same value. Changes and variations in process-parameters, such as sheet-resistance and out-diffusion of the several layers, affect both resistors in the same way, so that resistor tracking is always ensured.

The invention has been tested using finite element modeling in ANSYS. A nominal resistor value of 3 kΩ was designed. Subsequently various parameters were changed to test the tracking behavior:

Sheet resistance of the low-doped region (380 Ω/□— 400Ω/□) . . . results: resistors track with 0.2 Ω

Sheet resistance of the high-doped region (6 Ω/▽—7.5 Ω/▽) . . . results: resistors track within 0.2Ω

Mask blow-out of the low-doped region (0–1.75 μm) . . . results: resistors track within 0.2 Ω

Mask blow-out and out-diffusion of high-doped region (2.5 μm–4.5 μm) . . . results: resistors track within 0.2 Ω

The resulting resistor mismatch, which is due to the rounding in the finite-element analysis, will result in an inherently minimized offset voltage.

Figure 7:
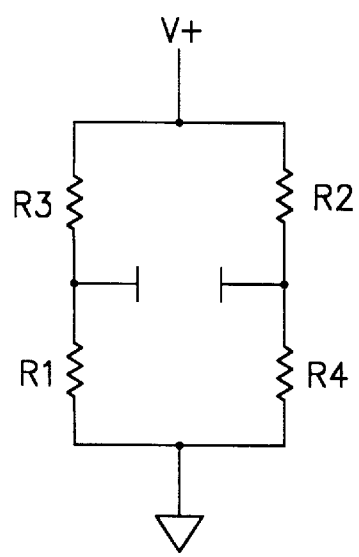
FIG. 7 is a diagram of a wheatstone bridge arrangement of resistors.

FIG. 7 illustrates the wheatstone bridge arrangement with the resistors label R1–R4, to correspond to the resistor labelings in FIGS. 4 and 5.

As will be understood by those of skill in the art, the present invention may be embodied in other specific forms without departing from the spirit or essential characteristics thereof. For example, the total lengths and widths of the contact regions could vary, so long as their area is equal and the distance to the closest edge on the 90 degree turns is equal. Accordingly, the foregoing description is meant to be illustrative, but not limiting, of the scope of the invention which is set forth in the following claims.

What is claimed is:

1. A piezo-resistive pressure sensor comprising;
    a substrate having a membrane;
    first and second pairs of electrically serially connected radial resistors formed geometrically in parallel on first and second opposite sides of said membrane,
        each of said first and second pairs having first ends which are closest to a center of said membrane and are connected by a first low-resistance connection region,
        each of said first and second pairs having second ends, located closest to said substrate, which are connected to a conductive interconnect layer, located on said substrate, with a pair of second low-resistance connection regions; and
    third and fourth pairs of electrically serially connected tangential resistors formed geometrically in series on third and fourth opposite sides of said membrane,
        each of said third and fourth pairs of tangential resistors having first ends located closest to each other which are connected by third low-resistance contact regions,
        each of said third and fourth pairs of tangential resistors having second ends, located furthest from each other, which are connected to said conductive interconnect layer, located on said substrate, by a pair of fourth low-resistance connection regions;
        wherein said connection regions are non-square rectangles, each having a length and width, and the width and total length of said first low-resistance connection region and said pair of second low-resistance connection regions equals the width and total length of said third low-resistance connection region and said pair of fourth low-resistance connection regions, said connection regions extending over a border from said substrate to said membrane.

2. A piezo-resistive pressure sensor comprising:
    a substrate having a membrane;
    first and second pairs of electrically serially connected radial resistors formed geometrically in parallel on first and second opposite sides of said membrane,
        each of said first and second pairs having first ends which are closest to a center of said membrane and are connected by a first low-resistance connection region,
        each of said first and second pairs having second ends, located closest to said substrate, which are connected to a conductive interconnect layer, located on said substrate, with a pair of second low-resistance connection regions; and
    third and fourth pairs of electrically serially connected tangential resistors formed geometrically in series on third and fourth opposite sides of said membrane,
        each of said third and fourth pairs of tangential resistors having first ends located closest to each other which are connected by third low-resistance contact regions,
        each of said third and fourth pairs of tangential resistors having seconds ends, located furthest from each other, which are connected to said conductive interconnect layer, located on said substrate, by a pair of fourth low-resistance connection regions;
    wherein said resistors and said connection regions are rectangular, each having two long and two short sides, wherein said connection regions are wider than said resistors, and wherein said first and second pairs of radial resistors are connected to a first long side of said first low-resistance connection region, each a first distance from a corner of said first low-resistance connection region and said third and fourth pairs of tangential resistors are connected to first and second long sides, respectively, of said fourth low-resistance connection regions, each a second distance equal to said first distance from a corner of said fourth low-resistance connection region.

3. A piezo-resistive pressure sensor comprising:
    a substrate having a membrane;
    first and second pairs of electrically serially connected radial resistors formed geometrically in parallel on first and second opposite sides of said membrane,
        each of said first and second pairs having first ends which are closest to a center of said membrane and are connected by a first low-resistance connection region,
        each of said first and second pairs having second ends, located closest to said substrate, which are connected to a conductive interconnect layer, located on said substrate, with a pair of second low-resistance connection regions; and
    third and fourth pairs of electrically serially connected tangential resistors formed geometrically in series on third and fourth opposite sides of said membrane,
        each of said third and fourth pairs of tangential resistors having first ends located closest to each other which are connected by third low-resistance contact regions,
        each of said third and fourth pairs of tangential resistors having second ends, located furthest from each other, which are connected to said conductive interconnect layer, located on said substrate, by a pair of fourth low-resistance connection regions;
    wherein said resistors and said connection regions are rectangular, each having two long and two short sides, wherein said connection regions are wider than said resistors, and wherein said first and second pairs of radial resistors are each connected to a short side, respectively, of said second low-resistance connection regions a first distance from a corner of said respective second low-resistance connection regions, and said third and fourth pairs of tangential resistors are each connected to a short side, respectively, of said third low-resistance connection regions, a second distance equal to said first distance from a corner of said respective third low-resistance connection regions.

4. A piezo-resistive pressure sensor comprising:

a substrate having a membrane;

first and second pairs of rectangular radial resistors formed geometrically in parallel on first and second opposite sides of said membrane, each of said first and second pairs having first ends closest to a center of said membrane which are connected by a first rectangular low-resistance connection region, each of said first and second pairs having second ends, closest to said substrate, which are directly connected without intervening conductors to a conductive interconnect layer, located on said substrate, with a pair of second low-resistance rectangular connection regions;

third and fourth pairs of rectangular tangential resistors formed geometrically in series on third and fourth opposite sides of said membrane, each of said third and fourth pairs of tangential resistors having first ends located closest to each other which are connected by third low-resistance rectangular connection regions, each of said third and fourth pairs of tangential resistors having second ends without intervening conductors located furthest from each other, which are directly connected to said conductive interconnect layer, located on said substrate, by a pair of fourth low-resistance rectangular connection regions;

wherein the width and total length of said first and second pairs of radial resistors equals the width and total length of said third and fourth pairs of tangential resistors;

wherein the width and total length of said first low-resistance connection region and said pair of second low-resistance connection regions equals the width and total length of said third low-resistance connection region and said pair of fourth low-resistance connection regions;

a plurality of contact regions, each contact region being formed on a portion of said substrate located off said membrane and being connected by said interconnect layer to said pair of second low-resistance connection regions and said pair of fourth low-resistance connection regions; and a plurality of conductive lines connected to said contact regions for connecting said resistors in a Wheatstone bridge arrangement.

5. The sensor of claim 4 wherein said resistors and said connection regions are rectangular, each having two long and two short sides, wherein said connection regions are wider than said resistors, and wherein said first and second pairs of radial resistors are connected to a first long side of said first low-resistance connection region, each a first distance from a corner of said first low-resistance connection region and said third and fourth pairs of tangential resistors are connected to first and second long sides, respectively, of said fourth low-resistance connection regions, each a second distance equal to said first distance from a corner of said fourth low-resistance connection region.

6. The sensor of claim 4 wherein said resistors and said connection regions are rectangular, each having two long and two short sides, wherein said connection regions are wider than said resistors, and wherein said first and second pairs of radial resistors are each connected to a short side, respectively, of said second low-resistance connection regions a first distance from a corner of said respective second low-resistance connection regions, and said third and fourth pairs of tangential resistors are each connected to a short side, respectively, of said third low-resistance connection regions, a second distance equal to said first distance from a corner of said respective third low-resistance connection regions.

* * * * *